United States Patent [19]

Hudson et al.

[11] 3,796,263

[45] Mar. 12, 1974

[54] TREATMENT OF AN UNDERGROUND FORMATION

[75] Inventors: Phillip E. Hudson, Austin; William B. Braden, Jr., Houston, both of Tex.

[73] Assignee: Texaco Inc., New York, N.Y.

[22] Filed: June 15, 1972

[21] Appl. No.: 263,063

[52] U.S. Cl. ............................................. 166/295
[51] Int. Cl............................................ E21b 33/138
[58] Field of Search............................ 166/292, 295

[56] References Cited
UNITED STATES PATENTS

| | | | |
|---|---|---|---|
| 3,393,737 | 7/1968 | Richardson | 166/292 |
| 3,438,440 | 4/1969 | Richardson | 166/292 |
| 3,285,339 | 11/1966 | Walther et al. | 166/295 |
| 3,297,086 | 1/1967 | Spain | 166/295 |

*Primary Examiner*—Stephen J. Novosad

[57] ABSTRACT

A method of treating underground formations, especially those containing clays or clay-like materials which are sensitive to fresh water, to desensitize the clays so they will not swell or disperse on contact with fresh water. The treatment consists of contacting the clay-containing formation with solutions which accomplish the electroless deposition of metal on the clay particles. Optionally, the formation can be resin coated prior to electroless plating.

9 Claims, No Drawings

TREATMENT OF AN UNDERGROUND FORMATION

FIELD OF THE INVENTION

The present invention relates to the treatment of clay-containing formations. More particularly, this invention relates to a method of treating underground formations containing clays or clay-like materials to render the clay fraction thereof insensitive to fresh water so that fluids such as water, steam, etc. may be injected into the formation without appreciable loss of permeability.

DESCRIPTION OF THE PRIOR ART

In modern day production of oil from subterranean formations it has become common practice to resort to supplemental recovery techniques, commonly referred to as secondary recovery techniques, in order to recover additional quantities of oil from the oil-containing formation. This is necessary because only a minor portion of the oil originally in place can ordinarily be recovered by so-called primary recovery. Among the supplemental recovery techniques in common use today are water flooding, steam injection, and injection of water containing various additives such as viscosity-increasing polymeric materials. A serious problem is encountered when the supplemental recovery technique requires the injection of water or steam into a subterranean oil-containing formation which also contains clay or clay-like materials. Contacting formations containing certain water-sensitive clays generally results in swelling of the clay by absorption of the water with the result that the permeability of the formation to the flow of injected fluid is substantially decreased. This decrease is permeability to the injected water-containing fluid causes substantial interference with the continuation of the supplemental recovery technique, and frequently forces the termination of the secondary recovery operation before it would otherwise be terminated.

Various techniques have been discovered for treating such formations containing water-sensitive clays so as to desensitize the clay fraction thereof, whereby conventional waterflood techniques can proceed. For example, in U. S. Pat. No. 2,761,843 the use of a substituted ammonium ion derived from basic nitrogen compounds to stabilize such clay-containing formations is disclosed. In U. S. Pat. No. 3,360,043 it is disclosed that guanidine salts, such as guanidine hydrochloride, in a polar oxygenated aliphatic hydrocarbon solvent, such as methanol, can be utilized to treat such clay-containing formations so as to desensitize them to the subsequent injection of fresh water.

Many of these chemical treating methods have been found to be generally satisfactory for use in treating clay-containing formations so that fresh water at ambient or relatively low temperatures can be injected. Such organic treating compounds are generally unsatisfactory for achieving desensitization of the clay-containing formation when the aqueous fluid is heated to a relatively high temperature, e.g., hot water or steam injection.

SUMMARY OF THE INVENTION

By the method of the present invention one is able to treat effectively subterranean, clay-containing formations so that they are desensitized through an electroless plating operation in a rapid and efficient manner while avoiding the disadvantages of the prior art methods and particularly avoiding the thermal limitations of prior art methods involving organic treating compounds.

One object of the present invention is to provide an improved method for treating an underground clay-containing formation to desensitize the clay portion of the formation. An additional object is to provide a thermally stable desensitizing treating composition and method. It is a further object of the invention to provide a means for desensitizing a clay-containing formation so that the clay fraction thereof will not swell or otherwise decrease the permeability of the formation during the subsequent injection of hot water or steam over long periods of time.

DESCRIPTION OF THE SPECIFIC EMBODIMENT

In carrying out the method of the present invention, it is sometimes preferable, prior to penetrating the formation with the electroless metal depositing solutions, that the formation can be pretreated or flushed to displace the formation hydrocarbon fluid and connate water away from the well bore by injecting thereinto a suitable preflushing liquid which can be, for example, an inert hydrocarbon oil such as diesel oil, distillate or a solvent such as isopropyl alcohol. Next, an aqueous solution containing an activating agent, such as colloidal palladium, is injected into the clay-containing formation for the purpose of activating the surface of the clay particles to be treated. Finally, an aqueous solution containing a metal plating compound and a reducing agent is injected into the formation.

Since the area of the formation immediately adjacent to an injection well bore exerts a relatively greater influence over the injectivity than any other portion of the formation located a greater distance away from the point of injection, it is generally necessary to treat only the portion of the formation immediately adjacent to the well bore. Since formations containing sufficient clay material to pose a problem in relation to clay swelling and permeability loss due to injection of fresh water are generally well consolidated, there is no necessity in forming a continuous metal matrix to bond the particles of the formation together. Although such a continuous metal matrix may be formed, if desired, generally it is necessary only to inject sufficient metal plating solution to adequately cover the clay particles, thereby sealing them off from subsequent contact with fresh water. The amount of fluid to be injected must therefore be carefully controlled to avoid plugging the formation due to deposition of metal in the essential flow channels thereof.

When the clay portion of a clay-containing subterranean formation is first treated by contacting the mass with a liquid capable of activating the particles of the formation and thereafter contacting the activated formation with a metal deposition solution containing chemicals comprising polyvalent metal ions and a reducing agent, the metal is reduced to the free metal and deposited on the surface of the particles contained in the formation. It is usually not necessary or desirable to bind the metal-encased particles together, except in special situations. Generally the amount of fluid should be only sufficient to coat the clay particles within the first few feet of the formation immediately adjacent to the injection well bore. When properly performed, this procedure results in forming an impermeable layer of metal surrounding the clay particles, thereby isolating such water-sensitive particles from subsequent injection of aqueous fluids such as water or steam. The particles are therefore no longer susceptible to swelling and consequent permeability reduction, and the stabilization is relatively long termed. Furthermore, the metal encasing the clay particles is not affected by the injection of high temperature fluids such as steam, even super-heated steam. The amount of either the activator or metal plating solution utilized in practicing the process of this invention will depend on the particular formation being treated. The treated area will ordinarily form generally cylindrically or spherically shaped regions extending from one to about five feet or more into the formation from the injection well bore.

In accomplishing the first step of the subject invention, the activator formulation is injected into the zone in which clay desensitization is sought to be accomplished. Acidic solutions of palladium chloride and/or stannous chloride can be used, or the corresponding bromide, nitrate or sulfate solutions. The activator solution should also contain a reducing agent, such as hydrazine, sodium hypophosphite, a lower aldehyde, e.g., formaldehyde, etc.

Preferably, the activator liquids are acid aqueous solutions acidified with acetic, formic or hydrochloric acid, etc. Other activator fluids which can be employed are aqueous solutions containing gold, ruthenium, rhodium or platinum, etc., together with a reducing agent such as hydrazine, and with or without a protective colloid such as gum arabic, tragacanth gum, gelatin, etc. The function of the reducing agent is to reduce the metal salt in the activator solution to the free metal which may be in colloidal form. Other activator liquids commonly used for electroless metal plating of nonmetallic objects may similarly be used.

After the activator fluid has been injected into and has adequately contacted the formation to be stabilized, it may be, if desired, displaced by an inert spacer fluid such as water, brine or a very dilute activator solution (i.e., one of the previously mentioned activator solutions diluted by a factor of 15 or more), etc. For example, an aqueous sodium chloride solution containing in the range of from 5 to 20 weight percent sodium chloride may be injected so as to displace the activator solution away from the well bore. Under certain formation conditions it may be possible and/or desirable to inject air into the formation to accomplish the same purpose.

The metal-containing plating solution can be acidic, having a pH of from 2 to 6, and a pH range of from 4 to 6 is especially preferable. Alkaline metal plating solutions may also be used, where desirable.

Metal plating compositions suitable for use in the preparation of this invention include, for example, nickel or cobalt chlorides and/or the corresponding sulfates. Reducing compositions useful in such electroless plating compositions include reagents such as hypophosphorous acid, hypophosphites, e.g., sodium hypophosphite, or alkaline solutions of formate, molybdenate and/or hydroxy carboxylates. The metal-containing compounds and the reducing agents may be present in concentrations ranging from about 1 to about 40 percent by weight each. A variety of suitable activator solutions as well as electroless metal plating solutions have been described in U. S. Pat. Nos. 3,393,737, 3,500,926, 3,500,927, 3,586,524, 3,438,411, etc., which are incorporated herein by reference. Wetting agents may be employed in the above-described solutions in order to promote the wetting of the surfaces to be stabilized.

The present invention avoids any undesirable delays in the inauguration of a supplemental recovery technique involving the injection of an aqueous fluid, since very little reaction time is involved in forming the desired metal encasement of the clay particles. Injection of fluid, even heated aqueous fluids, can be initiated immediately after completion of the plating process.

Previous treatment of the clay-containing formation with organic materials commonly used for the purpose of desensitizing such water-sensitive clays will not interfere with the subsequent employment of the present invention. If a formation has already been treated with one of the previously mentioned desensitizing techniques, such as the injection of a guanidine hydrochloride-methanol solution, the present invention may still be practiced if it is subsequently realized that the desired desensitization has not been as successful or has proved not to be as long lived or temperature stable as was desired.

It is at times difficult to satisfactorily plate clay-containing formations employing the electroless plating technique. This is especially true when steam flooding is utilized as a step in the secondary recovery process. For example, the metal films laid down may, under the temperature and pressure conditions existing, crack or peel, allowing water to contact certain portions of the formation with subsequent swelling thereof and reduction of permeability. Attempts have been made to correct this problem by modifying the electroless plating formulation through the use of modifiers, such as an organic sulfimide, as described in U. S. Pat. No. 3,586,524. However, all of these modified plating solutions known in the art suffer from one or more disadvantages.

It has been found that highly satisfactory metal coatings can be prepared by the electroless plating method if the clay-containing formation is first coated with an extremely thin coating of a phenol-formaldehyde resin. When the formation is first treated with a resinous composition and afterward electrolessly plated in the same manner as described above, the resultant metal coating is exceptionally stress-resistant both with regard to cracking and peeling when the formation is subjected to steam and/or hot water flooding. Any of the processes described in the art can be employed to coat the formation with the resinous composition. For example, the process described in U. S. Pat. No. 3,285,339 can be utilized.

The resinous composition used in the process of this invention includes, in addition to the phenolformaldehyde resin and catalyst, a coupling agent which not only has at least one functional group located at an exposed position in the molecule which reacts with the phenol-formaldehyde resin but also has at least one additional functional group capable of reaction with the clay particles in the formulation and/or the sand particles which form at least 5 to 10 percent or more of the usual clay-containing formation. Through the coupling agent the resinous coating is tenaciously bonded to the grains of material making up the formation.

A wide variety of coupling agents have been proposed and used with the phenol-formaldehyde resins, such as compounds of the formula:

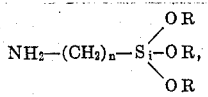

wherein $n$ is greater than 3 and R is alkyl of from 1 to 5 carbon atoms; and compounds of the formula:

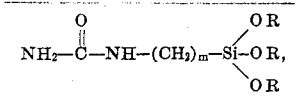

wherein $m$ is 1–5 and R has the same meaning as above. Although any of the above-listed coupling agents can be used in the process of this invention, an especially useful class of coupling agents includes compounds of the formula:

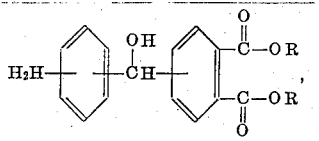

wherein R is alkyl of from 1 to 5 carbon atoms or more. These benzhydrol derivatives function as highly efficient coupling agents. The preparation of such compounds is described in U. S. Pat. No. 3,609,123. For example, 4'-amino-3,4-diethoxycarbonyl benzhydrol can be prepared by hydrogenolysis of diethyl-4-(para-nitrobenzonyl)-phthalate dissolved in ethanol in the presence of a 5 percent palladium on active carbon catalyst and under a hydrogen pressure of 5 kg/cm².

A second group of coupling agents which give a highly tenacious bond between the clay-containing formation and the plastic coating can be prepared by reacting a compound of the formula:

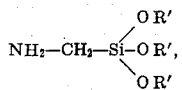

where R' is alkyl of from 1 to 10 carbon atoms, with an isocyanate of the formula:

$$OCN-R''-NCO,$$

where R'' is selected from the group consisting of arylene of not more than 8 carbon atoms or $-(CH_2)_r-$ wherein $r$ is an integer of from 1 to 5, inclusive. Generally, the reaction is conducted at a temperature of about 20° to about 130° C. in the presence of an inert solvent such as toluene and a catalyst which can be, for example, a tertiary amine such as triethylamine, etc. Preferably, stoichiometric quantities of the two reactants are employed and usually the amount of catalyst will vary from about 0.1 to about 5.0 percent by weight based on the amount of the isocyanate charged to the reactor. The coupling agents formed in the above-described reaction have the formula:

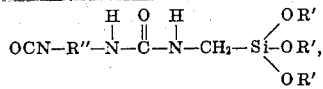

wherein R' and R'' have the same meanings as previously described. The ability of these compounds to form a firm attachment with the phenol-formaldehyde is believed to be due in part to the reaction of the terminal NCO group with the hydroxy group of the phenolic constituent. Generally a small quantity of a suitable catalyst such as triethylamine or stannous octoate is introduced along with the isocyanate-terminated coupling agent to insure that the desired reaction will take place. It is preferable to introduce the coupling agent and catalyst as a solution in, for example, diesel oil and/or isopropanol.

In the process of this invention, if resin coating of the formation is to be carried out before the formation is electrolessly plated, the formation to be treated is first isolated by any of the various means well known in the art, such as by packers, etc. The formation is then cleaned or preflushed by injecting a quantity of diesel oil or other inert hydrocarbon flushing material, such as distillate or crude oil. In the next step a solution or mixture of one or more of the previously described coupling agents and catalyst, if required, is injected into the formation. Optionally, following the injection of the coupling agent, the formation may again be treated with an inert flushing liquid such as diesel oil, distillate or isopropanol to remove excess coupling agent from the pores of the formation. Next, the required volume of the partially polymerized resin mixture is introduced into the formation and finally the excess resin is removed, if desired, by flushing with an inert liquid which can be the same materials previously employed in preflushing the formation. Finally, the well is shut in for a period of time sufficient to permit the resin to harden or cure. After this, the formation is then in a state suitable for treatment with the activator solution followed by any of the electroless plating procedures previously described.

The volume of the liquid flushing agent employed in the initial cleaning operation is not critical and generally will be from about one to about 15 barrels per foot of producing formation.

A variety of materials may be utilized as carriers for the coupling agent, such as diesel oil, distillate, crude oil, water, isopropanol, n-butanol, etc. Generally the coupling agent will be present in the solution injected in amounts of from about 0.020 to about about 2 percent by weight based on the total weight of the injected solution. After the coupling agent has been forced into the formation, generally, as previously pointed out, there is injected an additional quantity of the inert flushing agent. Usually about 0.2 to about 3.5 barrels per vertical foot of formation is utilized. If desired, this step may be omitted entirely.

The phenol-formaldehyde resin can be any of those previously described in the art for use in treating underground formations. Examples of such resins and detailed procedures for introducing them into the formation are set forth in U. S. Pat. Nos. 2,378,817, 2,604,172 and 2,476,015, which are incorporated herein by reference in their entirety. Preferably, a partially polymerized resin is employed. The solution of the partially polymerized resin in, for example, ethanol, propanol, etc., together with a catalyst such as aqeous caustic soda, is pumped down the well and into the formation. Preferably, the partially polymerized resin solution, which will contain about 20 to about 35 percent by weight of partially polymerized resin solids based on the weight of the alcohol solvent and the resin solution, should exhibit a viscosity of less than about 20 stokes. More viscous solutions may place an undue strain on pumping equipment or excessively coat tubing, etc.

and, in general, prevent successful introduction into the pores of the formation.

Generally, from about 0.75 to about 12 barrels per vertical foot of formation of the resin solution is injected into the formation. The amount of catalyst employed in the resin solution can be from about 0.5 to 2 percent by weight based on the weight of the phenol-formaldehyde resin present in the resin solution. Useful catalysts include guanidine carbonate, sodium carbonate, ethyl amine, aniline, ethylene diamine, etc.

As soon as the resinous solution has been injected into the formation, an overflushing liquid, which can be, for example, an alcohol such as ethanol, isopropanol, etc., or a hydrocarbon such as diesel oil, distillate, bright stock, etc., is forced into the formation to remove excess resinous material. Usually from about 0.5 to about 10 barrels per vertical foot of treated formation is utilized, although this overflush may be omitted entirely, if desired.

In a final step the well is closed in to permit the resin to set. Generally this time will be from about 5 to about 45 hours, depending upon the reservoir temperature, particular phenol-formaldehyde resin solution employed, etc.

The following examples illustrate various embodiments of the invention and are to be considered not limitative.

EXAMPLE I

A core which was obtained from a well drilled into a water-sensitive consolidated sandstone formation was potted for ease of treatment and permeability measurements using conventional techniques. The particular Berea sandstone core was from a formation known to be so water-sensitive that the permeability will decrease essentially to zero after injection of several pore volumes of relatively fresh water. The particular core tested measured 2.2 centimeters in length, 3.80 square centimeters in area and had a pore volume of 1.5 cubic centimeters. Original permeability to a 10 percent-by-weight sodium chloride solution was found to be 142 millidarcies. The injection procedures involved the following treatments:

1. Approximately 17 pore volumes of a stannous chloride solution (100 grams of stannous chloride per liter) with 40 milliliters per liter of hydrochloric acid.
2. The core was next rinsed with a 10 percent-by-weight sodium chloride spacer solution.
3. A 0.1 gram-per-liter palladium chloride solution containing 1.0 ml/1 hydrochloric acid was next injected. Approximately 1.7 pore volumes was injected.
4. Approximately 35 pore volumes of a 10 percent-by-weight sodium chloride solution was then injected.
5. 22 pore volumes of a nickel plating solution was next injected. The solution was composed of:
   80 grams per liter nickel sulfate
   24 grams per liter sodium hypophosphite
   12 grams per liter sodium acetate
   8 grams per liter boric acid
   6 grams per liter ammonium chloride The pH of the nickel plating solution was in the range of 4.8 to 5.8 during the time of injection.

After treatment, distilled water was injected into the treated core to determine the resultant permeability and the stability of such permeability over an extended period of continued injection of distilled water. Table I illustrates the measured permeability over an extended period of time when the distilled water was injected into the treated core.

TABLE 1

| Pore Volumes of Distilled Water Injected | Permeability |
|---|---|
| 25 | 13 |
| 50 | 45 |
| 100 | 62 |
| 200 | 64 |
| 300 | 60 |
| 400 | 56 |
| 500 | 52 |
| 600 | 50 |
| 700 | 49 |

As can be seen from the above, the final permeability of the treated core was about 50 percent of the original value, even after injection of 700 pore volumes of distilled water.

EXAMPLE II

In a producing well at 6,500 feet a producing zone perforated over a distance of four feet is isolated with appropriate packers. The formation is preflushed by injecting into it through the perforation, at a rate of one barrel per minute, a total of 40 barrels of diesel fuel mixed with 10 barrels of isopropyl alcohol at a pressure of 2,000 psig. Next, 20 barrels of a solution of 0.08 percent by weight of 4-amino-3,4-dimethoxycarbonyl benzhydrol dissolved in isopropyl alcohol is pumped into the formation at the rate of 0.50 barrels per minute, following which the formation is flushed with 15 barrels of n-butanol at the rate of about one barrel per minute. A total of 40 barrels of a resin solution consisting of 25 percent by weight of partially polymerized phenolformaldehyde resin solids in n-propanol together with about 0.80 weight percent of sodium hydroxide added as 30 percent by weight aqueous solution was prepared. After the resin solution had been forced into the formation at a pressure of about 2,500 psig, a total of 38 barrels of diesel oil, which serves to flush the excess resin from the formation, is injected at the rate of about 0.6 barrels per minute and at 3,000 psig. The well is then shut in for 25 hours to permit the resin coating to harden.

The formation is then electrolessly plated with nickel by first injecting into the formation, at the rate of 0.5 barrels per minute, 15 barrels of activator solution of the following composition:

TABLE 1

| | 1 Barrel |
|---|---|
| Water | 40.7 gallons |
| Gum arabic | 20.6 gms |
| Hydrazine hydrate (85%) | 256 cc (or 400 cc of 35% hydrazine) |
| Palladium chloride solution* | 636 cc |
| Buffers: | |
| Formic acid (90%) | 640 cc |
| Sodium formate | 7 pounds |

*Contains 1.6 gms PdCl$_2$, 10 cc conc. HCl, 90 cc distilled or deionized water.

NOTE: Chemical must be added to the water in the order listed with complete mixing and dissolving before adding the next chemical.

In the next step, 25 barrels of water is injected into the formation to serve as a spacer. The nickel plating solution (30 barrels) is then injected into the formation at the rate of 0.4 barrels per minute and at about 2,000 psig. The composition of the electroless nickel plating solution employed is as follows:

TABLE 2 a. 807 gallons filtered drinking water
b. 885 pounds NiSO$_4$·6H$_2$O
c. 1,260 pounds NaH$_2$PO$_2$·H$_2$O
d. 945 pounds Na acetate·3H$_2$O
e. 315 pounds Na succinate·6H$_2$O
f. 252 gallons glacial acetic acid
g. a solution of 89 pounds FeSO$_4$ was added thereafter.

In a steam flooding operation utilizing the above treated well as an injection well, no appreciable reduction in input rates is noted after one week, indicating that the nickel electrolessly plated on the clay-containing formation is a satisfactory method of preventing water-swelling of the formation as well as erosion of the formation at the steam injection face.

Any of the activator solutions as well as electroless plating solutions previously described can be utilized in plating on the resin-coated, clay-containing formations.

While much of the foregoing description of the preferred specific embodiment is directed to the stabilization of clay-containing formations associated with subterranean hydrocarbon-containing formations, the present invention is similarly applicable to stabilization of soils located on or near the surface of the earth where great mechanical strength is desired or where a serious water-sensitivity problem exists. For example, the present invention could be used to stabilize soils for foundations requiring great strength or where electrical conductivity may be required.

What is claimed is:

1. A process of treating a clay-containing formation penetrated by a well which comprises:
  a. injecting through the well and into the formation a preflushing liquid,
  b. injecting through the well and into the formation a mixture of a coupling agent in a carrier liquid,
  c. injecting through the well and into the formation a solution of a resin coating composition comprising a partially polymerized phenol-formaldehyde resin and a curing agent,
  d. shutting in the well for a period of 12 to 48 hours to permit the resin to harden,
  e. injecting through the well and into the formation an aqueous activator solution containing an agent capable of activating the surface of the said formation, and
  f. injecting through the well and into the formation an aqueous solution containing a metal plating compound and a reducing agent whereby substantial metal plating of the formation adjacent to the borehole is achieved.

2. The process of claim 1 wherein the said coupling agent injected in step (b) is a compound of the formula:

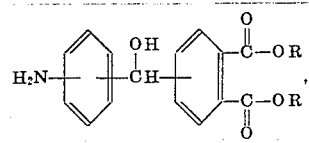

wherein R is alkyl of from 1 to 5 carbon atoms.

3. The process of claim 1 wherein the said coupling agent injected in step (b) is a compound of the formula:

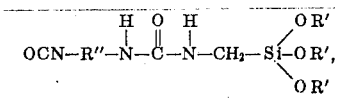

wherein R' is alkyl of from 1 to 10 carbon atoms and R" is selected from the group consisting of arylene of not more than 8 carbon atoms and —(CH$_2$)$_r$, wherein r is from 1 to 5, inclusive, and wherein a catalyst is injected with the coupling agent.

4. The process of claim 1 wherein the solutions injected in steps (e) and (f) are separated by injection of a spacer fluid.

5. The process of claim 1 wherein in (e) and (f) acidic solutions are employed.

6. The process of claim 1 wherein after step (b) a liquid flushing agent is injected through the well and into the formation.

7. The process of claim 1 wherein in step (f) the metal plating compound is a nickel compound.

8. The process of claim 1 wherein in step (e) the said aqueous activator solution comprises a solution compound selected from the group consisting of palladium, platinum, gold, ruthenium, rhodium and stannous chloride bromide, nitrate or sulfate and mixtures thereof, together with a reducing agent.

9. The process of claim 1 wherein in step (e) the said aqueous activator solution comprises an acidic aqueous solution of palladium chloride and hydrazine hydrate.

* * * * *